C. O. MESSENGER.
SAW.
APPLICATION FILED NOV. 30, 1920.
1,385,385.
Patented July 26, 1921.
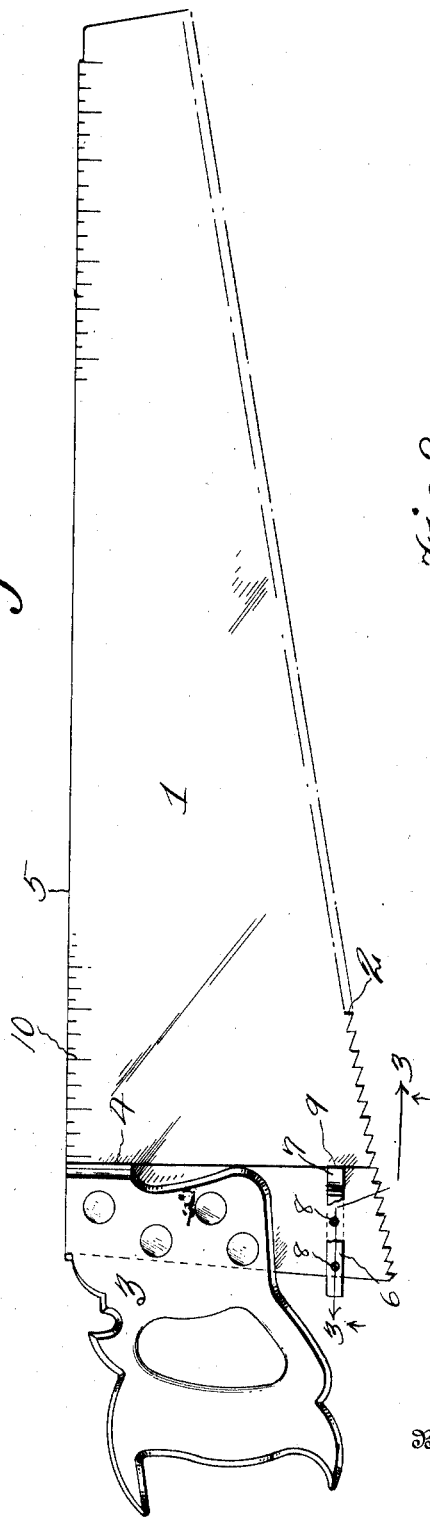
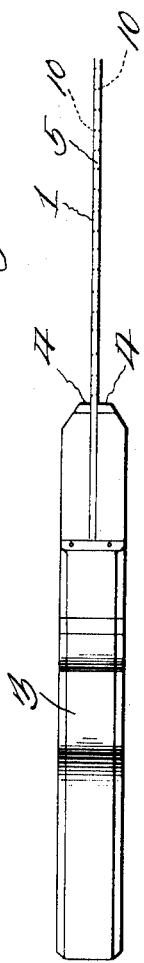
Inventor
C. O. Messenger
By D. Swift
his Attorney

UNITED STATES PATENT OFFICE.

CHARLES O. MESSENGER, OF ASTORIA, OREGON.

SAW.

1,385,385.   Specification of Letters Patent.   Patented July 26, 1921.

Application filed November 30, 1920. Serial No. 427,268.

*To all whom it may concern:*

Be it known that I, CHARLES O. MESSENGER, a citizen of the United States, residing at Astoria, in the county of Clatsop, State of Oregon, have invented a new and useful Saw; and I do hereby declare the following to be a full, clear, and exact description of the invention, such as will enable others skilled in the art to which it appertains to make and use the same.

The invention relates to handsaws, and has for its object to provide a saw of this character having graduations adjacent its upper edge and to provide a U-shaped clamp on the rear edge of the saw blade and located beneath the handle, said U-shaped clamp having the forward ends of the arms thereof in vertical alinement with the forward sides of the handle and at right angles to the upper edge of the saw blade whereby the saw may be used as a square.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of saw showing a scale thereon and a U-shaped clamping member in place on the blade;

Fig. 2 is an enlarged top elevation of a portion of the saw blade and its saw handle; and Fig. 3 is a sectional view taken on line 3—3 of Fig. 1, looking in the direction of the arrows.

Referring to the drawings, the numeral 1 designates a conventional form of saw blade and 2 the serrated cutting edge thereof. Secure to the rear end of the blade 1 is a handle 3 adapted to be grasped by the operator during a sawing operation. Handle 3 may be secured to the blade in any conventional manner and the forward edge thereof is provided with metallic plates 4, which plates are right-angularly disposed with relation to the upper edge 5 of the saw blade and are adapted to be placed in engagement with the edge of a board when the saw is being used as a square. To prevent wabbling of the saw as a whole when used as a square and when the plates 4 are in engagement with the edge of a board, the U-shaped clamp 6 having the ends of its arms enlarged as at 7 is placed on the rear end of the saw blade and held thereon by means of screws 8 which pass through one of the arms and through apertures in the blade 1. The forward ends 9 of the U-shaped member 6 are in vertical alinement with the front faces of the plates 4 and form means for preventing wabbling of the saw when being used as a square. For the reason that engaging points for the edge of the board are provided which are considerably spaced apart, the operator can firmly hold the saw in place while scoring or marking the board along the upper edge 5 of the saw blade. The saw blade adjacent its upper edge is provided with graduations 10, thereby allowing the saw blade to be used for measuring purposes.

From the above it will be seen that a saw is provided which may be used as a measuring device, a handsaw, or a square, and that the conventional shape of the saw is not changed and that the only modification on the saw structure necessary will be the placing of the scales on the saw and the drilling of two holes in the blade for the reception of the screws 8.

The invention having been set forth, what is claimed as new and useful is:—

1. A combined handsaw and square comprising a handle member and a graduated blade, a U-shaped member arching the rear end of the blade and disposed beneath the handle member, means passing through one of the arms of the U-shaped member and apertures in the blade for holding said U-shaped member in place, said U-shaped member being in vertical alinement with the forward edge of the handle member and right-angularly disposed in relation to the upper edge of the saw blade.

2. The combination with a handsaw having a graduated blade and a handle member, of a U-shaped clamping member carried by the rear edge of the saw blade and disposed beneath the handle member, the ends of the arms of the U-shaped member being in vertical alinement with the forward edges of the handle member on each side of the blade, said ends of the arms and forward edges of the handle member being right-angularly disposed in relation to the upper edge of the saw blade.

In testimony whereof I have signed my name to the specification in the presence of two subscribing witnesses.

CHARLES O. MESSENGER.

Witnesses:
HOWARD K. ZIMMERMAN,
FRANCES L. DUNBAR.